(12) United States Patent
Bodin

(10) Patent No.: US 8,549,931 B2
(45) Date of Patent: Oct. 8, 2013

(54) SPEED OR TORQUE PROBE FOR GAS TURBINE ENGINES

(75) Inventor: Robert Michael George Bodin, Hampshire (GB)

(73) Assignee: Weston Aerospace Limited, Farnborough, Hampshire (GB)

(*) Notice: Subject to any disclaimer, the term of this patent is extended or adjusted under 35 U.S.C. 154(b) by 193 days.

(21) Appl. No.: 13/067,651

(22) Filed: Jun. 16, 2011

(65) Prior Publication Data

US 2011/0308331 A1   Dec. 22, 2011

(30) Foreign Application Priority Data

Jun. 22, 2010   (GB) .................................. 1010497.4

(51) Int. Cl.
*G01L 1/02*   (2006.01)

(52) U.S. Cl.
USPC .................................. 73/862.193; 73/862.191

(58) Field of Classification Search
USPC ..................... 73/862.193, 862.191; 324/158
See application file for complete search history.

(56) References Cited

U.S. PATENT DOCUMENTS

| | | | | |
|---|---|---|---|---|
| 4,444,063 A | * | 4/1984 | Snowden et al. | ......... 73/862.326 |
| 4,829,245 A | * | 5/1989 | Echasseriau et al. | ......... 324/174 |
| 5,744,951 A | * | 4/1998 | Babin et al. | .................... 324/173 |
| 6,424,144 B1 | * | 7/2002 | Palfenier et al. | .............. 324/174 |

FOREIGN PATENT DOCUMENTS

| | | |
|---|---|---|
| EP | 0 571 129 | 11/1993 |
| JP | 7-280823 | 10/1995 |

OTHER PUBLICATIONS

UK Search Report dated Sep. 16, 2010 for GB 1010497.4.
UK Search Report dated Nov. 24, 2010 for GB 1010497.4.
UK Search Report dated Mar. 23, 2011 for GB 1103608.4.

* cited by examiner

*Primary Examiner* — Lisa Caputo
*Assistant Examiner* — Jamel Williams
(74) *Attorney, Agent, or Firm* — Nixon & Vanderhye P.C.

(57) ABSTRACT

There is provided a variable reluctance sensor for sensing the speed or torque of a shaft in a gear box or gas turbine engine, comprising a magnetic pole piece a conductive wire wrapped around the pole piece a housing surrounding the pole piece, the housing having a front face and at least one side wall, wherein, in use, the front face is positioned proximate to an object to be sensed wherein the pole piece is rigidly fixed to the side wall of the housing. This arrangement reduces microphony in the sensor.

18 Claims, 5 Drawing Sheets

SPEED OR TORQUE PROBE FOR GAS TURBINE ENGINES

This application claims priority to GB Application No. 1010497.4 filed 22 Jun. 2010, the entire contents of which are incorporated herein by reference.

FIELD OF THE INVENTION

The present invention relates to variable reluctance probes used for measuring the speed and torque applied to rotating shafts. Probes of this type are typically found in gas turbine engines or in gear boxes used in aircraft.

BACKGROUND TO THE INVENTION

Variable reluctance sensors are used to monitor both the speed of rotating shafts and the torque loading on shafts in gas turbine engines and gear boxes connected to gas turbine engines. For example, FIG. 1 illustrates an assembly for monitoring the torque loading on a power transmission shaft between a gas turbine and the power gearbox that drives the propeller.

When a load is applied to a power transmission shaft it will twist. For a known modulus of elasticity and at a constant temperature, the amount of twist (A) is proportional to the torque transmitted. This basic principle is used to measure torque.

The assembly shown in FIG. 1a comprises two intermeshed phonic wheels 10, 11, attached to the rotating shaft 12 but at points longitudinally spaced from each other. The torque transmitted by the shaft is calculated by measuring the time difference between the passage of the teeth of the two phonic wheels past a variable reluctance sensor. FIG. 1b illustrates a sensor 14 positioned adjacent to the teeth of a phonic wheel 17.

From FIG. 1a, it can be seen that the phase wheel 10 is attached directly to the shaft 12. The reference wheel 11 is attached to a reference tube 13 mounted concentric with the torque shaft 12, and is fixed to the torque shaft at one end leaving the reference wheel 11 free. When the shaft 12 is loaded it will twist but the unloaded reference tube 13 will not, so that the phase wheel 10 moves relative to the reference wheel 11. As a result, the reference wheel becomes a datum from which to calculate the angle of twist, θ. As the phonic wheels 10, 11 are intermeshed movement of the phonic wheels with respect to each other will be evident by the time intervals of the passage of phonic teeth on the phonic wheels past the sensor. The teeth on the phase phonic wheel will move closer to the teeth on the reference phonic wheel in the direction of rotation and twist. At the same time the distance between the trailing teeth of the reference phonic wheel in respect to the phase phonic wheel teeth will increase. This is illustrated in FIGS. 2a and 2b, which are schematic representations of the relative positions of the teeth on each wheel in an unloaded state and a loaded state respectively. The distance of 'tm' is always smaller than 'ts' so that the control system can differentiate between 'tm' and 'ts' when the phonic wheels start to rotate.

The distance between the phonic wheel teeth will be seen as the distance between the zero crossovers in the A/C signal produced by the variable reluctance sensor. The change in distance in the zero cross over will be directly proportional to the angle of the twist of the shaft (θ) and so the torque transmitted by the shaft. A typical clean signal waveform from a variable reluctance sensor sensing the passage of the teeth can be seen in FIG. 4, with time on the x-axis and voltage on the y-axis.

The same basic principle is equally applicable for the measurement of rotational speed via a phonic wheel. The time between the passings of adjacent teeth past a sensor can be measured to provide a signal from which rotational speed can be calculated.

Both the conventional type of variable reluctance sensor, where many turns of a conductive wire are wrapped around a magnetic pole piece, and the transformer type as described in U.S. Pat. No. 7,148,679, where a few turns of a primary turn of conductive wire are wrapped around magnetic pole piece, can be used. FIG. 3 is a schematic cross section of a typical construction of a variable reluctance sensor.

The sensor of FIG. 3 comprises a magnetic pole piece 30 around which an electrically conductive wire 31 is wound. A permanent magnet 32 is positioned adjacent a back face 30a of the pole piece 30. The front face of the pole piece 30b is, in use, located proximate to the phonic wheel or wheels being sensed, as shown in FIG. 1b. The pole piece 30, conductive wire 31 and permanent magnet are all held in a housing 33. An encapsulation material 34, typically a powder or an epoxy resin, is used to fill the space between the housing 33 and the pole piece 30, magnet 32 and conductive wire 31. The housing 33 is fixed to another part of the turbine engine (not shown) and ensures that the front face of the pole piece is correctly positioned relative to the phonic wheel or wheels. The housing also provides protection from the harsh environment found inside gas turbine engines.

As each tooth of the phonic wheels passes close to the front face of the pole piece there is a change in the magnetic flux experienced by the conductive wire 31, due to the change in the reluctance of the magnetic circuit consisting of the pole piece 30, the phonic wheel and the air gap between the two. The changing magnetic flux results in a variable current induced in the conductive wire 31, from which the timing of the passage of the teeth on the phonic wheels past the pole piece can be determined.

In both torque and speed measurement, it is important that the waveform produced by the variable reluctance sensor is very clean and there is no noise or additional modulations, known as microphony, on the signal waveform. FIG. 4 illustrates a clean waveform. In contrast, FIG. 5 shows a waveform that is not acceptable as there is significant noise 50 present. If the noise amplitude exceeds the trigger threshold of the engine controls, the torque or speed measuring system will not function properly as the noise will be interpreted as an additional zero crossing, and in extreme circumstances the controls may shut the engine down if the torque or speed measurement is a primary engine function.

One major cause of noise in the output from variable reluctance sensors, producing the additional modulations or microphony, is vibration from the surrounding environment. Vibration can be created from many areas of a gas turbine engine and surrounding ancillary equipment, such as the power gear box where large intermeshing teeth create vibration, out of balance shafts, bearings and compressor/turbine blades and discs.

The reason that vibrations cause noise in the output signal is the affect that they have on the pole piece. Vibration in the sensor environment can cause stress in the pole piece that alters its magnetic permeability. The change of the magnetic permeability of a material when subjected to a mechanical stress is known as the Villari effect. The stress energy created in the pole piece causes strain, which affects the permeability and so alters the reluctance of the device. As the pole piece has conductive wires wrapped around it and a magnet or coil attached at one end, the change in reluctance will cause a change in the magnetic flux around the pole piece, inducing an additional electrical current in the conductive wire wrapped around the pole piece. This additional induced current is the source of noise or microphony in the output signal. This effect is more noticeable at high vibration frequency levels because of the greater rate of change of permeability of the pole piece.

A problem with existing sensors, as illustrated in FIG. 3, is that any forces exerted on the pole piece 30 by the magnet 32 and/or the surrounding encapsulation medium or the housing front face result in strain energy in the pole piece 30. This strain energy changes the permeability of the pole piece, creating EMF in the conductive wire 31, which produces additional, unwanted modulations in the waveform, as shown in FIG. 5.

In a sensor as illustrated in FIG. 3, the inventors have found that there are two main mechanisms by which strain is generated in the pole piece. First, vibration from the surrounding environment causes the magnet to vibrate. The permanent magnet is relatively massive and vibrations of the magnet produce stress in the pole piece as the magnet pushed against it, resulting in microphony in the coil. Second, vibration from the surrounding environment causes vibration of the housing front face, which is transferred to the pole piece as strain energy, resulting in microphony in the coil.

The encapsulation material does, to some extent, reduce the transfer of vibration to the pole piece, and epoxy resin as an encapsulation material has proven to be the most effective material. However, at high frequency and high temperature there is still significant noise in the sensor output as a result of environmental vibrations. One factor is that, at the high temperatures found in gas turbine engines, the epoxy resin used as an encapsulating material is relatively soft.

It is an object of the present invention to substantially reduce the sensitivity of variable reluctance sensors, suitable for use in gas turbine engines, to noise resulting from environmental vibrations.

SUMMARY OF THE INVENTION

The present invention is defined in the appended claims to which reference should be made. Preferred features of the invention are set out in the dependent claims.

In a first aspect, the invention comprises a variable reluctance sensor for sensing the speed or torque of a shaft in a gear box or gas turbine engine, comprising:
  a magnetic pole piece;
  a conductive wire wrapped around the pole piece;
  a housing surrounding the pole piece, the housing having a front face and at least one side wall, wherein, in use, the front face is positioned proximate to an object to be sensed,
  wherein the pole piece is rigidly fixed to the side wall of the housing.

By fixing the pole piece to the side wall of the sensor housing, strain in the pole piece as a result of external vibration is significantly reduced. The strain is effectively transferred to the side wall of the housing rather than along the length of the pole piece. Preferably, the pole piece comprises a longitudinal shaft proximate to the front face of the housing, wherein the conductive wire is wrapped around the longitudinal shaft, and a head end remote from the front face of the housing, wherein the head end is fixed to the side wall of the housing.

Preferably, the pole piece is rigidly fixed to a plurality of points on the housing. By connecting the pole piece to the housing at a plurality of points or over an extended area, the transfer of strain can be increased. "Rigidly fixed" in this context means more than simply held in place through an interference fit with other components of the sensor or with an encapsulation material. It requires a positive fixing means. The pole piece may be fixed to the side wall or side walls of the housing by any suitable means, such as welding, brazing or by using some mechanical fixing, such as a screw fitting. It is also possible to include a rigid intermediate structure between the pole piece and the housing to provide the rigid fixing. The pole piece is then directly fixed to the intermediate structure and the intermediate structure directly fixed to the housing. This may have advantages in the assembly of the sensor.

The pole piece may extend through the front face of the housing and it may be advantageous that the pole piece is not fixed to the front face of the housing, so as to minimise the transfer of strain from the front face of the housing. Whether a connection between the pole piece and the front face of the housing is required depends on whether a seal is required isolating the interior of the housing and the environment in which the sensor is operating.

Alternatively, or in addition, the front face of the housing may be made substantially less stiff that the side wall of the housing. By having a front face that is able to flex, less stress is exerted on the pole piece under external vibration.

It is important that the conductive wire does not move relative to the pole piece. A packing material, such as fibre glass tape covered in varnish, or an epoxy resin, may be provided around the conductive wire and the portion of the pole piece around which the wire is wrapped, to secure the wire relative to the pole piece.

The variable reluctance sensor may further comprise a permanent magnet within the housing and adjacent to the pole piece. In this case, typically, the pole piece has a front end adjacent to the front face of the housing and a rear end positioned adjacent to the permanent magnet, with the rear end fixed to the side wall of the housing. The permanent magnet may be rigidly fixed to a side wall to minimise relative movement between the magnet and the pole piece.

In a second aspect, the invention comprises a variable reluctance sensor for sensing the speed or torque of a shaft in a gear box or gas turbine engine, comprising:
  a magnetic pole piece;
  a conductive wire wrapped around the pole piece;
  a housing surrounding the pole piece, the housing having a front face and at least one side wall, wherein, in use, the front face is positioned proximate to an object to be sensed,
  wherein the pole piece extends through the front face of the housing and the front face of the housing is substantially less rigid than the side wall of the housing.

Optional or preferred features described in relation to the first aspect may equally be applied to the second aspect of the invention.

In a third aspect, the invention comprises a gas turbine engine comprising:
  a rotating shaft;
  a phonic wheel mounted to the shaft for rotating with the shaft; and
  a variable reluctance sensor according to the first or second aspect, wherein the front face of the housing is positioned proximate to the phonic wheel.

BRIEF DESCRIPTION OF THE DRAWINGS

Embodiments of the invention will now be described in detail, by way of example, with reference to the accompanying drawings, in which.

DETAILED DESCRIPTION

Figure 1A:
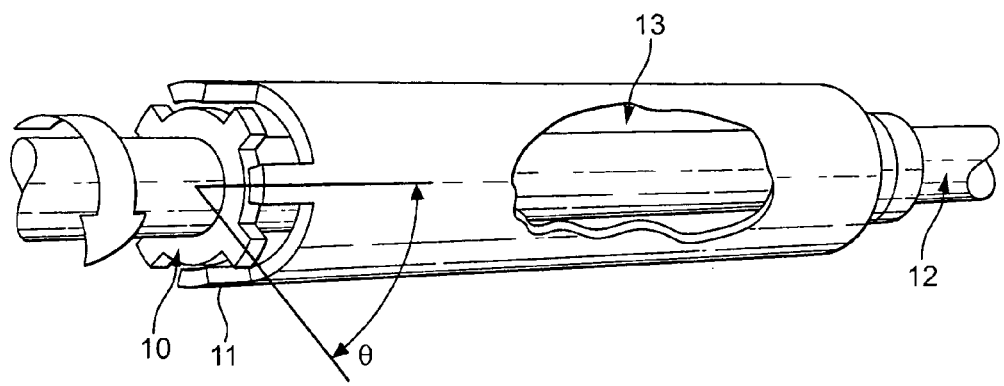
FIG. 1a is perspective, partially cut away, view of a phonic wheel assembly for torque measurement.
Figure 1B:
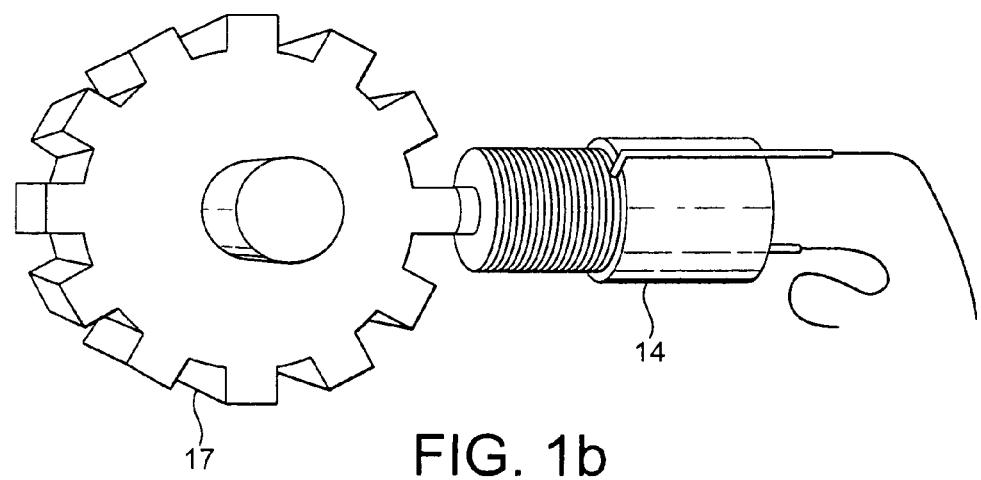
FIG. 1b illustrates a variable reluctance sensor positioned adjacent to a phonic wheel.
Figure 2A:
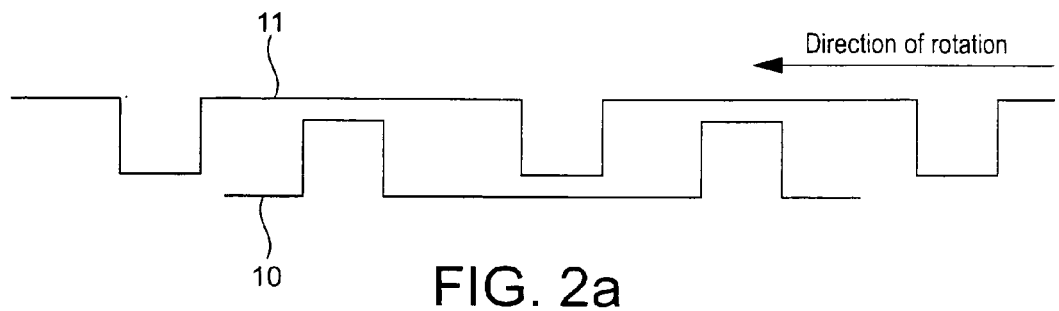
FIG. 2a is a schematic representation of the teeth of the phonic wheels of FIG. 1a with no load applied to the power transmission shaft.
Figure 2B:
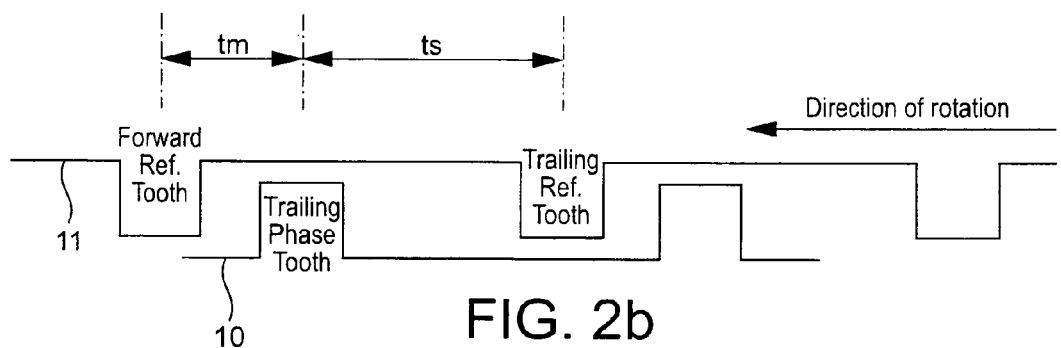
FIG. 2b is a schematic representation of the teeth of the phonic wheels of FIG. 1a with a load applied to the power transmission shaft.

The basic arrangement for a variable reluctance sensor for detecting speed or torque in a gas turbine engine or gear box connected to a gas turbine engine has been described previously with reference to FIGS. 1 to 3. The problem of unwanted microphony in the output signal from such variable reluctance sensors, resulting from strain in the magnetic pole piece 30, has also been described.

Figure 3:
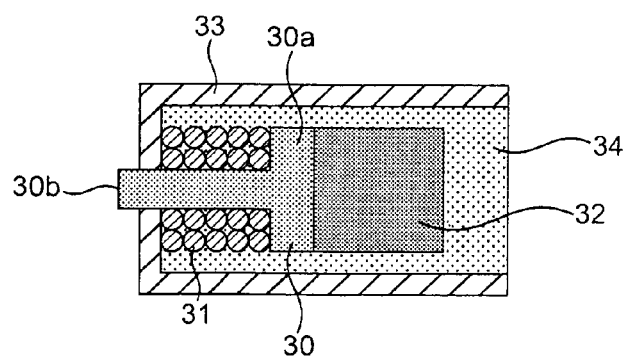
FIG. 3 is a schematic cross section of a prior variable reluctance sensor.
Figure 4:
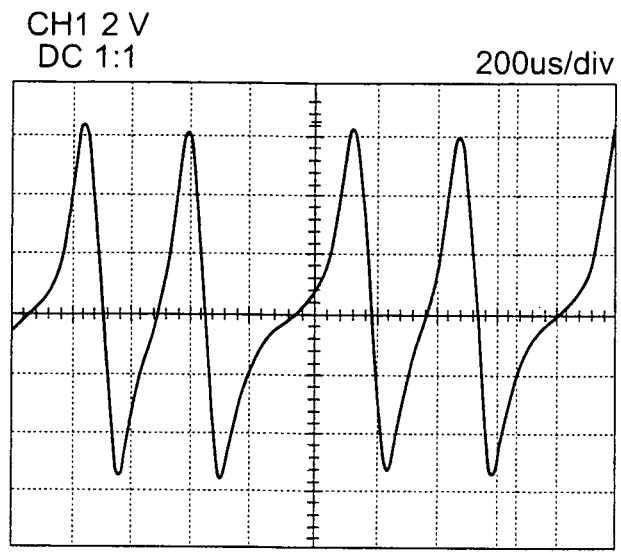
FIG. 4 is a clean output waveform from a variable reluctance sensor.
Figure 5:
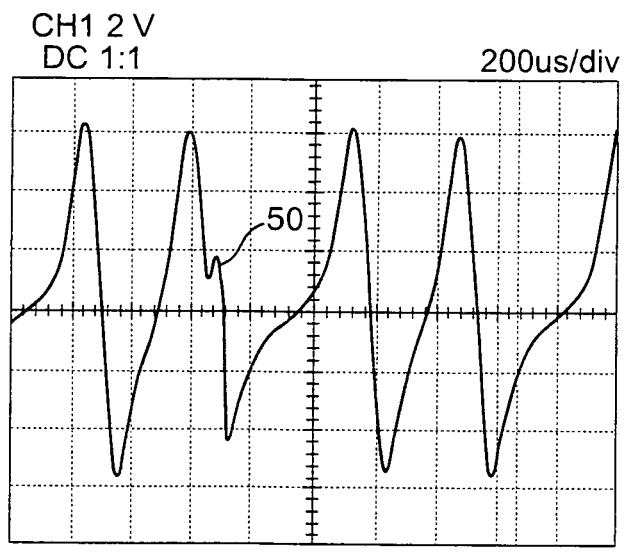
FIG. 5 is a noisy output waveform from a variable reluctance sensor.
Figure 6:
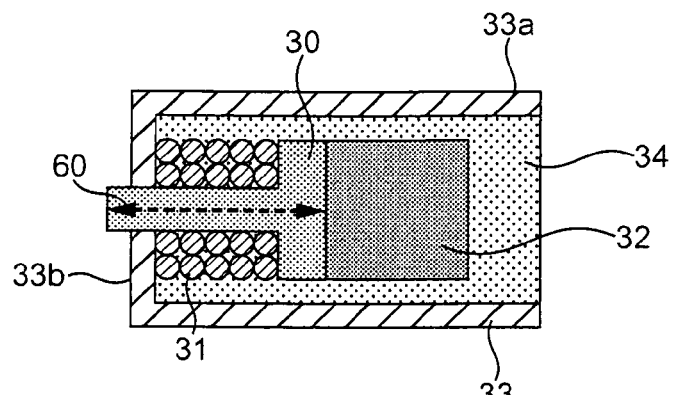
FIG. 6 is a schematic cross section of a prior variable reluctance sensor with an indication of the forces on the pole piece as a result of environmental vibrations.

FIG. 6 illustrates a variable reluctance sensor as shown in FIG. 3, but illustrating the direction of the strain in the pole piece 30, which affects the nature of the output signal from conductive wire 31. The pole piece is formed from a soft magnetic material, is roughly T-shaped in cross-section and has a longitudinally extending shaft around which the conductive wire is wound and a rear head, against which the permanent magnet 32 is positioned. Current induced in the wire 31 as result of changes in the reluctance of the circuit formed by the magnetic pole piece, the phonic wheel, and air gap between the phonic wheel of a pole piece are used to determine torque and/or speed. Longitudinal strain in the longitudinal shaft of the pole piece indicated by arrow 60 alters the magnetic permeability of the pole piece, in the region around which the conductive wire is wound. Any change in permeability also causes a variable reluctance in the magnetic circuit, and so induces an additional current in the conductive wire 31.

As described above, the longitudinal strain in the pole piece results from vibration of the sensor assembly, and in particular is transferred to the pole piece both from the permanent magnet 32 and from the front face of the housing 33b. Typically, although the pole piece extends through the front face of the housing, it is attached to the front face of the housing by a welded or brazed joint. The pole piece is therefore effectively trapped between the front face of the housing 33b and permanent magnet 32.

Figure 7:
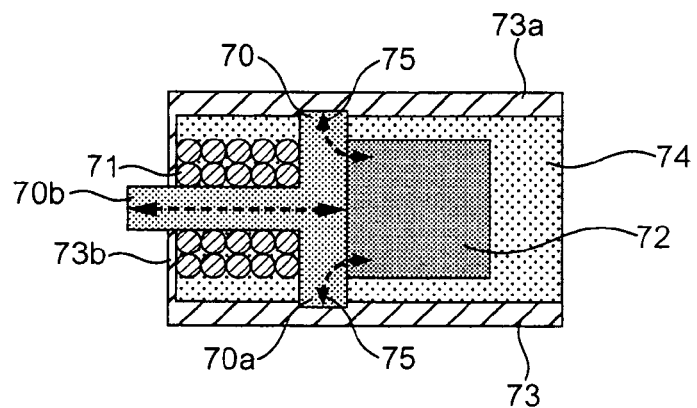
FIG. 7 is a schematic cross section of a first variable reluctance sensor in accordance with the invention.

FIG. 7 illustrates a variable reluctance sensor in accordance with the present invention. The sensor of FIG. 7 differs from the prior sensor shown in FIG. 6, in that the flat head of the pole piece 70a extends to and is rigidly fixed to the side walls 73a of the housing 73. The front face of the housing 73b is also made substantially thinner, and therefore less massive and substantially more flexible (or less rigid) than the side walls of the housing 73a.

As a result of these modifications, strain in the pole piece, resulting in the force exerted by the permanent magnet 72 is transferred to the side walls 73a of the housing, rather than all being concentrated along the longitudinal shaft 70b of the pole piece, as illustrated by arrows 75. This results in a significant reduction in the strain within the pole piece and hence a reduction in the noise in the output of the sensor. The fact that the front face of the housing 73b is more flexible, means that less force is applied to the pole piece from the front face of the housing. This also reduces noise in the output from the sensor.

The pole piece may be fixed to the front face 73b of the housing, for example by welding, if it is required to have a good seal so as to protect the interior of the housing from the outside environment. However, if a good seal is not required, the pole piece may advantageously not be connected to the front face 73b of the housing, so that the housing exerts no significant force on the pole piece when it vibrates.

The materials used to make the sensor shown in FIG. 7 are substantially the same as those used conventionally in variable reluctance sensors of this type. The pole piece is formed in a single piece and is made of soft magnetic material, such as soft iron or ferritic stainless steel.

The encapsulation material is a high temperature epoxy resin, a powdered material, or a ceramic paste or silicone rubber.

The permanent magnet may formed from any suitable material such as Samarium Cobalt, Alcomax™, Hycomax™, and Alnico™. The conductive wires are typically formed from insulated copper or copper alloy winding wire. The housing is formed from stainless steel.

In the embodiment shown in FIG. 7, the pole piece 70 is welded to the side walls of the housing 73. Advantageously, the pole piece is welded to the housing at a plurality of locations, or over an extended area. All that is required is that there is a sufficient space for the conductive wires to pass through the pole piece or between the pole piece and the housing to connect to external processing electronics. Typically, the housing is cylindrical, with a round cross-section, and the pole piece is welded to the side walls of the housing around its circumference. Ideally, the connection of the pole piece to the housing is symmetrical about the longitudinal axis of the pole piece.

Alternatively, other means of rigidly fixing the pole piece to the housing may be used, such as a screw fixing or a clamp fitting. The pole piece might also or alternatively be glued to the side walls of the housing.

Figure 8:
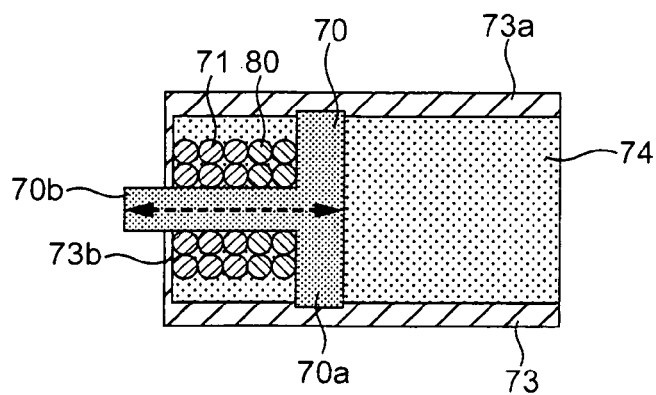
FIG. 8 is a schematic cross section of a second variable reluctance sensor in accordance with the invention.

FIG. 8 shows an alternative embodiment of a variable reluctance sensor in accordance with the invention. In the sensor of FIG. 8, the pole piece is magnetised by a primary circuit 80 wound around the pole piece, through which an alternating current is passed. The permanent magnet of the embodiment shown in FIG. 7 can therefore be removed and is simply replaced by further encapsulation material 74. This type of sensor is sometimes known as a transformer type sensor. Even in the absence of a massive permanent magnet within the housing, the features of fixing the pole piece to the side walls of the housing and of making the front face of the housing more flexible and less massive, still have significant benefit in reducing strain energy in the pole piece. Again, the pole piece may be anchored only to the side walls and not the front face of the housing, or alternatively may be anchored to both the side walls and the front face of the housing, as required.

Figure 9:
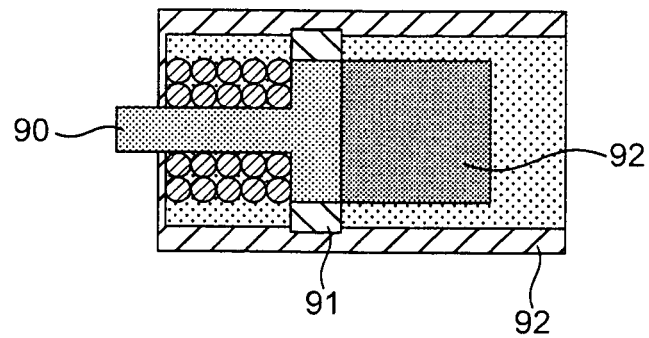
FIG. 9 is a schematic cross section of a third variable reluctance sensor in accordance with the invention.
Figure 10:
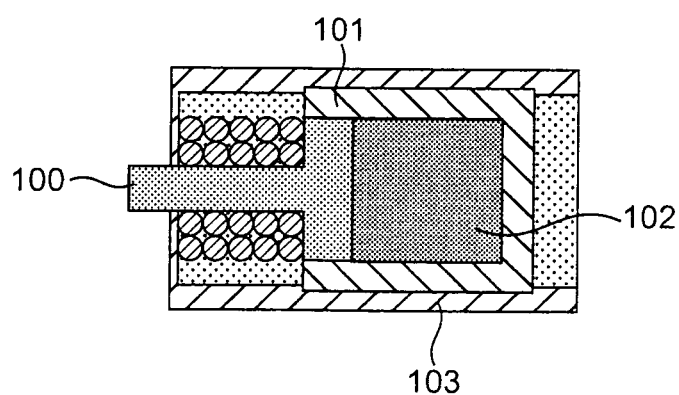
FIG. 10 is a schematic cross section of a fourth variable reluctance sensor in accordance with the invention.

FIGS. 9 and 10 illustrate two further embodiments of a variable reluctance sensor in accordance with the invention, similar to the embodiment of FIG. 7, but that provide for simple manufacture and assembly. In the sensor of FIG. 9 the pole piece 90 has a ring 91 attached to it. The ring is formed from a stainless steel or other material that remains rigid at high temperature. The ring 91 may be brazed, glued or welded to the pole piece base. This ring 91 is then be attached to the housing 93 by welding, mechanical attachment or adhesive as before.

FIG. 10 shows a sensor similar to that shown in FIG. 9, but with a cup 101 in place of a ring. The cup protrudes further back than the ring of FIG. 9 and forms a cup around the pole piece 100 and magnet 102. The cup 101 provides support and helps to locate the magnet 102 onto the pole piece base so that the base of the pole piece and magnet act as one unitary mass. The cup 101 is attached to the housing 103 by welding, mechanical attachment or adhesive, in a similar manner as before.

In both the embodiment of FIG. 9 and FIG. 10 there still needs to be sufficient space for conductive wires to pass the pole piece base and magnet for electrical connections.

Variable reluctance sensors in accordance with the present invention are able to measure speed or torque parameters reliably in harsh, vibrating environments, both at low and high vibration frequencies, and at high temperatures. They are also protected from instantaneous shock loads which would otherwise induce strain in the pole piece.

The invention claimed is:

1. A variable reluctance sensor for sensing the speed or torque of a shaft in a gear box or gas turbine engine, comprising:
    a magnetic pole piece;
    a conductive wire wrapped around the pole piece;
    a housing surrounding the pole piece, the housing having a front face and at least one side wall, wherein, in use, the front face is positioned proximate to an object to be sensed,
    wherein the pole piece is rigidly fixed to the side wall of the housing.

2. A variable reluctance sensor according to claim 1, wherein the pole piece is rigidly fixed to a plurality of points on the housing.

3. A variable reluctance sensor according to claim 1, wherein the pole piece is welded to the housing.

4. A variable reluctance sensor according to claim 1, wherein the pole piece is mechanically fixed to the housing.

5. A variable reluctance sensor according to claim 1, further comprising a rigid intermediate structure wherein the pole piece is rigidly fixed to the rigid intermediate structure, and the rigid intermediate structure is rigidly fixed to the housing.

6. A variable reluctance sensor according to claim 1, wherein the pole piece extends through and is fixed to the front of the housing.

7. A variable reluctance sensor according to claim 6, wherein the pole piece is welded to the front face of the housing.

8. A variable reluctance sensor according to claim 1, wherein the pole piece extends through the front face of the housing but is not fixed to the front face of the housing.

9. A variable reluctance sensor according to claim 1, wherein the front face of the housing is substantially less rigid than the side wall of the housing.

10. A variable reluctance sensor according to claim 1, further comprising a permanent magnet, the permanent magnet positioned within the housing adjacent to the pole piece.

11. A variable reluctance sensor according to claim 10, wherein the permanent magnet is rigidly fixed to a side wall of the housing.

12. A variable reluctance sensor according to claim 10, wherein the pole piece has a front end adjacent to the front face of the housing and a rear end positioned adjacent to the permanent magnet, and wherein the rear end of the pole piece is fixed to the side wall of the housing.

13. A variable reluctance sensor according to claim 1, wherein the pole piece is formed in one piece and comprises a longitudinally extending shaft around which the conductive wire is wrapped, and a rear end which is rigidly fixed to the housing.

14. A variable reluctance sensor according to claim 1, wherein the conductive wire is held in place relative to the pole piece by a packing material surrounding the conductive wire and a portion of the pole piece.

15. A gas turbine engine comprising:
    a rotating shaft;
    a phonic wheel mounted to the shaft for rotating with the shaft; and
    a variable reluctance sensor according to claim 1, wherein the front face of the housing is positioned proximate to the phonic wheel.

16. A variable reluctance sensor for sensing the speed or torque of a shaft in a gear box or gas turbine engine, comprising:
    a magnetic pole piece;
    a conductive wire wrapped around the pole piece;
    a permanent magnet adjacent to the pole piece;
    a housing surrounding the pole piece and the permanent magnet, the housing having a front face and at least one side wall, wherein, in use, the front face is positioned proximate to an object to be sensed,
    wherein the pole piece is rigidly fixed to the side wall of the housing.

17. A variable reluctance sensor for sensing the speed or torque of a shaft in a gear box or gas turbine engine, comprising:
    a magnetic pole piece;
    a conductive wire wrapped around the pole piece;
    a housing surrounding the pole piece, the housing having a front face and at least one side wall, wherein, in use, the front face is positioned proximate to an object to be sensed,
    wherein the pole piece extends through the front face of the housing and the front face of the housing is substantially less rigid than the side wall of the housing.

18. A variable reluctance sensor according to claim 17 wherein the pole piece is fixed to the front face of the housing.

* * * * *